Oct. 11, 1932.  O. G. GILSTRAP  1,881,486
PROPELLER
Filed Jan. 29, 1931.   2 Sheets-Sheet 1

Owen G. Gilstrap
INVENTOR

ATTORNEY

Oct. 11, 1932. O. G. GILSTRAP 1,881,486
PROPELLER
Filed Jan. 29, 1931 2 Sheets-Sheet 2
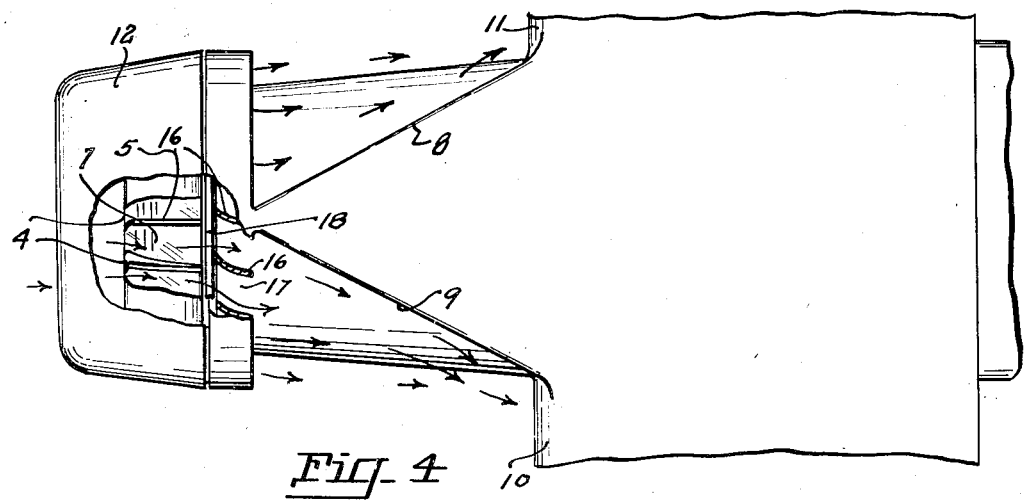
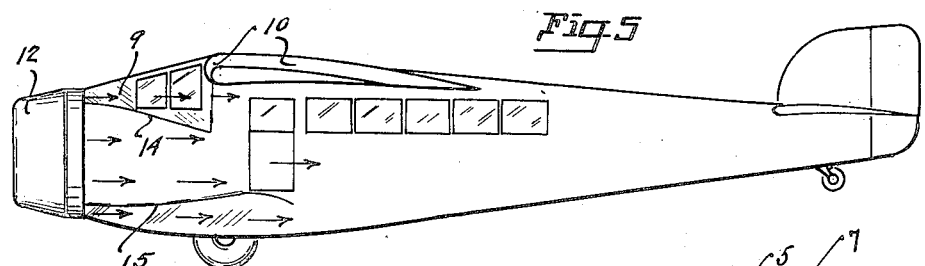
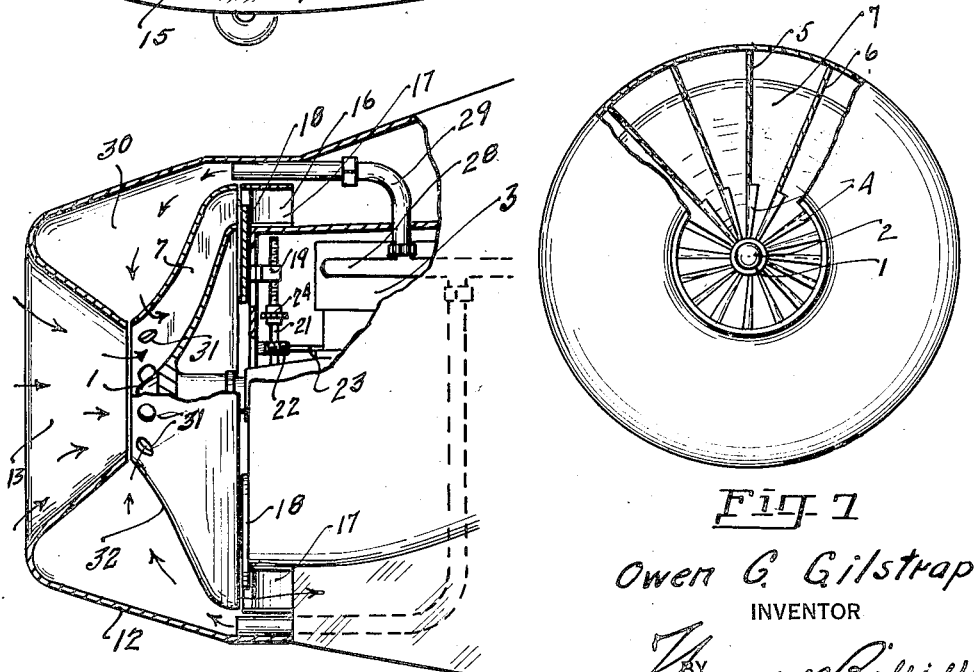
Owen G. Gilstrap
INVENTOR Patented Oct. 11, 1932

1,881,486

UNITED STATES PATENT OFFICE

OWEN G. GILSTRAP, OF PORTLAND, OREGON, ASSIGNOR OF ONE-THIRD TO CHESTER D. RIES, OF PORTLAND, OREGON

PROPELLER

Application filed January 29, 1931. Serial No. 511,963.

My invention relates to aeroplane and airship propellers and has as its purpose and object the propelling and stabilizing of an airship while in flight.

The invention in its preferred embodiment consists in placing a power driven centrifugal propeller, at the forward end of the ship, and rotating it at the desired rate of speed. The air currents developed by the rotation of the centrifugal propeller have their direction of travel diverted in order to aid in propelling the craft forward and in a stable condition and permits the air craft to receive the greatest possible advantage therefrom in other respects.

Air diverters are placed around the periphery of the propeller immediately behind its discharge openings in order to divert the discharger air in a stream line under the aeroplane wings and along the side of the fuselage. These diverters are stationary and mounted on the front of the fuselage.

Adjustable restriction plates are placed between the propeller discharge and the air diverters. One plate is placed at the top and one at the bottom and they are arranged so that they can be adjusted by the pilot at anytime. The purpose of these restriction plates is to permit the regulation of the discharge openings of the propellers in order to regulate the load on the power unit.

The exhaust lines of the engine are placed so that the exhaust gases from the engine are drawn into the chamber inside of the intake nozzle of the propeller, thence through openings into the propeller proper.

The primary object of my invention is to give added speed to the aircraft when equipped with this new type centrifugal propeller.

A still further object of my invention resides in the fact that the air currents developed by the speed of the craft and by the centrifugal propeller are directed so that they will aid in increasing the speed, the stability and lifting power of the craft.

A further object of my invention is to reduce the height of the landing gear thus reducing the air friction and giving greater safety to landing operations.

A still further object of my invention consists in providing a relatively self-contained fuselage, in which the landing gear is formed integral with the fuselage and in which the landing gear projects slightly below the surface of the fuselage, to thereby produce an airship, that is amphibious in its character.

A still further object of my invention is to create a suction within the exhaust manifold of the engine, to thereby aid in the scavenging of the motor and to simultaneously therewith lessen the fire hazard.

A still further object of my invention consists in creating a negative atmospheric pressure within the exhaust manifold, to thereby prevent the building up of the back pressure within the exhaust manifold and to thereby increase the operating efficiency of the engine.

A still further object of my invention is to deliver air through the propeller at an increase of temperature over normal air and to deliver the same along the sides of the fuselage, to thereby provide an airship that may be successfully and efficiently operated in low temperatures.

The object of the adjustable restriction plates is to provide compensation for effective engine loads and for regulating the same, irrespective of the density, or rarity of the air, through which the ship is passing, to thereby provide regulatory means for developing the more efficient working conditions for the engine in light and heavy air.

A still further object of my invention is to lower the center of gravity of the craft.

A still further object of my invention is to increase the visibility of the pilot.

A still further object of my invention is to lessen, if not entirely eliminate, the head air resistance encountered in the operation of the ship in an area tributary to the propeller.

With these and incidental objects in view, the invention consists in certain novel features of construction and combination of parts, the essential elements of which are set forth in the appended claims and a preferred form of embodiment of which is hereinafter shown with reference to the drawings which accompany and form a part of this specification.

In the drawings:

Fig. 4 is a top, plan view, partially in section of the entire assembly of the centrifugal propeller and of the associated elements.

Figure 1:
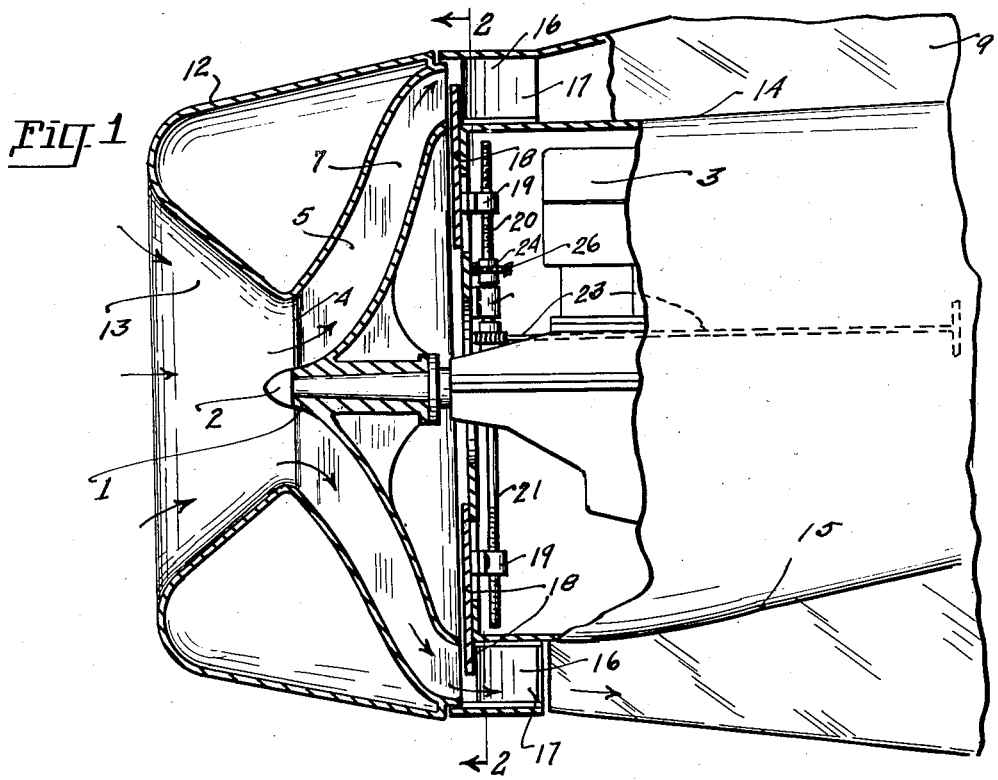
Fig. 1 is a side elevation, partially in section, of the power driven centrifugal propeller, the nozzle in which the same is located and of the air diverters that are adapted for controlling and the diverting of the air currents, that are to be developed and of the adjustable restriction plates; in this view the entire exposed area of the nose of the ship is adapted for being rotated.
Figure 2:
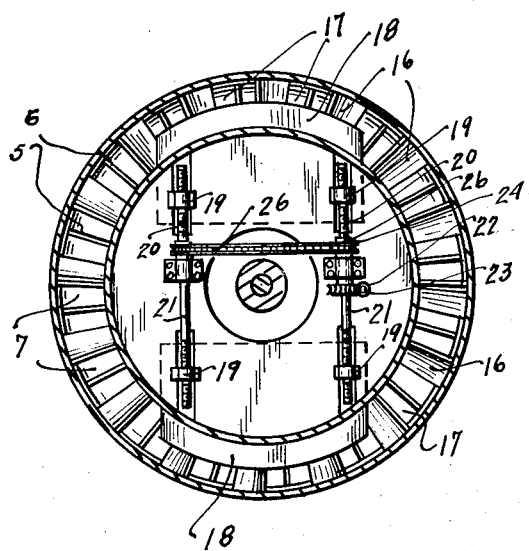
Fig. 2 is a sectional, end view of the assembly illustrated in Fig. 1, looking in the direction indicated.
Figure 3:
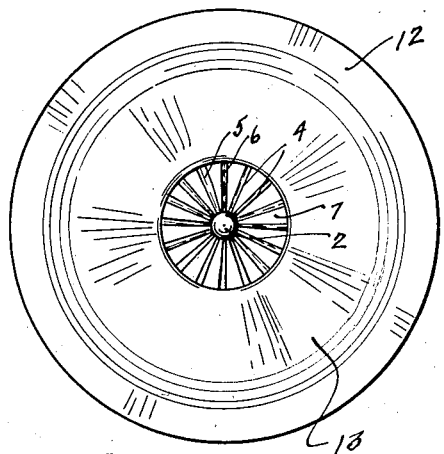
Fig. 3 is a front, end view of the mechanism illustrated in Fig. 1.

The air diverters 16 shown in Fig. 4 are so arranged that they divert the air from a spiral rearward direction to a straight rearward direction.

Fig. 5 is a side view of an aeroplane, in which my new and improved propeller and assembly is placed thereupon, the arrows illustrate the direction that the air currents take, past the fuselage.

Fig. 6 is a side elevation, partially in section, of a modified form of the nose of the ship and illustrating my new and improved construction disposed thereupon; in this view, the propeller assembly only, is shown rotatable within the nose, which is fixedly positioned, relative to the cowling.

Fig. 7 is a front view, partially in section, of the mechanism shown in Fig. 6.

Like reference characters refer to like parts throughout the several views.

My device is primarily intended for use upon aeroplanes, though the same may be used with equal facility upon high powered speed boats and in any and all places where air resistance to high speeds and the lifting power of the air forms an important factor in locomotion.

I preferably use a propeller whose hub 1 is directly or indirectly secured to the shaft 2 of the prime mover 3. The centrifugal propeller has sets of gathering blades 5 and 6 disposed in spaced relationship with each other and which extend outwardly from the hub 1. Each of the blades has fins 4 that extend outwardly from the blade structure. These fins assist in transmitting the air of propulsion into the space disposed between the sets of blades 5 and 6 and thereby aid the craft in speed and lifting power. When the air passes through the nozzle of the centrifugal propeller, it travels rearwardly through a predetermined channel, illustrated in Fig. 1 at 7, and created by sets of blades and is discharged through the spaced air diverters 16 that provide spaces 17 therebetween. The air currents contact sloping surfaces 8 and 9 of the side of the vehicle and beneath the wing structure 10 and 11. A cowling 12 is disposed at the nozzle of the propeller and its converging side walls form a frusto-conical structure 13 that conducts the air currents directly into the path of the centrifugal propeller and thereby intensifies the feeding pressure within the centrifugal propeller when substantial speed has been obtained.

It may be found desirable to place fins 14 and 15 at either side of the craft, as illustrated in Fig. 5 in order to cause the air currents to flow along the side walls of the craft at the desired angle and thereby aid in propulsion of the craft.

In Fig. 6 I have arranged the centrifugal propeller and cowling 12, so that the engine exhaust gases can be drawn into the channels behind the nozzle of the propeller. The purpose of this is to prevent ice formations on the centrifugal propeller and also to greatly decrease the exhaust noises and the back pressure on the engine. This arrangement will also cause the exhaust gases to be thoroughly mixed with such a large volume of clean air that the mixture will not be objectionable if it should enter the cabin of the plane.

The cowling and centrifugal propeller may be built as one piece and both rotate, as shown in Fig. 1, or they can be built in two pieces with the cowling fastened to the fuselage and the centrifugal propeller only rotating, as shown in Fig. 6.

I am aware that attempts have heretofore been made to take advantage of the velocity imparted to the air in order to force a craft forward, but I am not aware that this has been done in the manner and for the purpose herein shown and specified. I am changing the direction of the air, to which a relatively high velocity has been imparted, in order that the greatest advantage may be taken of the air for the purpose specified.

To aid in increasing the speed and lifting power of a craft, I have observed that great advantages accrue wherein adjustable restriction plates 18 are placed adjacent the stream flow of the air currents. These restriction plates may be manipulated by a common actuator disposed at either side of the longitudinal axis of the prime mover and of the craft. When so arranged, the respective and oppositely disposed plates may be moved by having threaded lugs, or blocks 19 disposed adjacent the oppositely disposed edges of the plates into which the threaded actuating screws 20 are disposed. Each of the threaded screws, or shafts, has a right hand thread turned upon one of its ends and a left hand thread upon its oppositely disposed end, each of which is adapted to coact with the threaded blocks 19. One of the threaded stems has a worm wheel 21 disposed thereupon and a worm 22 coacts therewith. The worm 22 is mounted upon a shaft 23.

The shaft may be hand manipulated or power manipulated. Suitable driving and driven elements, as sprockets 24 and 25 are mounted upon the respective threaded stems 20 and a common driving element, as a chain 26, is disposed therearound.

The width of the restriction plates will depend upon the character of the craft upon which the same is mounted, the power that is to be applied to the craft and the character of the air in which the same is to be operated. The forward landing wheels 27 are supported upon a suitable frame work disposed within the fuselage and the same extend slightly therebelow. Each of the wheels rotates within recesses formed within the under skin of the craft and the same are made relatively water tight, in order that the craft may be landed upon land, or water with equal facility.

For increasing the operating efficiency of the engine, I hitch a suction pipe to the exhaust manifold 28 and run the pipe 29 from the exhaust pipe 28 and terminate the same within the interior 30 of the cowling. Exhaust holes 31 lead from the interior 30 and through the outer surface 32 of the centrifugal propeller. The high velocity at which the air is being passed, creates a suction and negative atmospheric pressure within the interior 30 of the cowling and a negative atmospheric pressure is thereby created within the pipe 29 and the exhaust manifold 28.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device adapted for being rotatably secured to the power shaft of an aeroplane engine, comprising a plurality of curved blades extending outwardly from the power shaft, said blades disposed in spaced relationship to each other and forming curved channelways therebetween, fins secured to the peripheries of each of the blades, means disposed immediately in front of the blade assembly adapted for inducing air currents to contact and pass through the blade assembly, means disposed upon the aeroplane fuselage for diverting the air currents emanating from the channelways in order to have them contact the fuselage, and means for regulating the volume of air currents emanating from the channelways.

2. Apparatus as in claim 1 wherein the means for inducing air currents to contact and pass through the blade assembly includes a frusto-conical shaped cowling forming a nozzle with its inner wall surfaces.

3. Apparatus as in claim 1 wherein the blade assembly and the means for inducing air currents to contact and pass through the blade assembly are integral with each other.

4. Apparatus as in claim 1 wherein the means for regulating the volume of air currents emanating from the channelways includes a plurality of restriction plates disposed within the fuselage immediately in rear of the blade assembly, and means for manipulating said restriction plates.

OWEN G. GILSTRAP.